United States Patent Office 3,649,645
Patented Mar. 14, 1972

3,649,645
NAPHTHOSTYRIL TYPE DISPERSE DYES
Eiji Yamada, Ibaragi-shi, Kiichiro Yamaguchi, Minoo-shi, and Takashi Akamatsu, Ashiya-shi, Japan, assignors to Sumitomo Chemical Company, Ltd., Osaka, Japan
No Drawing. Filed Apr. 1, 1969, Ser. No. 812,394
Claims priority, application Japan, Apr. 6, 1968, 43/23,043; Sept. 3, 1968, 43/63,535; Sept. 4, 1968, 43/63,913; Sept. 14, 1968, 43/66,311
Int. Cl. C07d 27/46
U.S. Cl. 260—326.62
10 Claims

ABSTRACT OF THE DISCLOSURE

Naphthostyril type compounds suitable for dyeing or coloring hydrophobic man-made fibrous materials, particularly a polyester, polyester ether, acetyl cellulose or polyamide, are

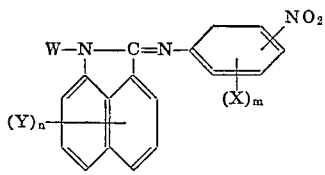

wherein W is hydrogen, lower alkyl, phenyl (lower alkyl), or phenyl group; Y is hydrogen, halogen, nitro, lower alkyl, lower alkoxy, lower alkylmercapto or lower dialkylamino group; X is hydrogen, cyano, nitro, halogen, trifluoromethyl, lower alkyl, lower alkoxy, —$SO_2R$ or —COOR; $n$ is an integer of 1 to 4; $m$ is an integer of 1 to 4; and R is lower alkyl.

---

This invention relates to a process for dyeing or coloring a synthetic shaped polymeric material, particularly in the form of fibrous material such as polyester, polyester ether, acetyl cellulose or polyamide fibers, and to novel naphthostyril type dyes represented by the formula:

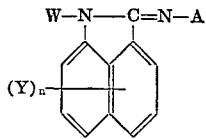
(I)

wherein W signifies hydrogen atom, a lower alkyl group, an aralkyl group or a phenyl group, Y signifies hydrogen atom, a halogen atom, nitro group, a lower alkyl group, a lower alkoxy group, a lower alkylmercapto group or a lower dialkylamino group, $n$ is an integer of 1 to 4, and A signifies a member of

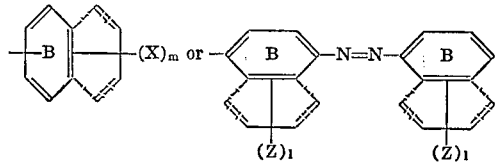

wherein X signifies hydrogen atom, nitro group, cyano group, a halogen atom, trifluoromethyl group, —$SO_2$—R, —COOR, —R, —OR, —SR,

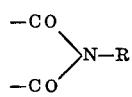

(where R is a lower alkyl group), a benzothiazolyl group, a benzimidazolyl group, a benzoxazolyl group, a phenoxy group, a phenyl group, an anilino group, a phenylmercapto group.

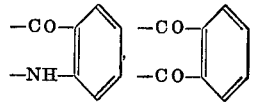

(these phenyl groups may have further been substituted by halogen atoms, nitro groups, lower alkyl groups or lower alkoxy groups), Z signifies hydrogen atom, a halogen atom, nitro group, a lower alkyl group, a lower alkoxy group, a lower alkylmercapto group, a lower dialkylamino group as cyano group, B signifies benzene or naphthalene nucleus, and $l$ and $m$ are an integer of 1 to 4.

The novel dyes of the present invention are obtained by reacting in the presence of a condensing agent a naphthostyril or a derivative thereof represented by the formula,

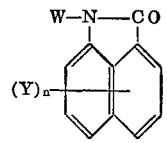
(II)

wherein W, Y and $n$ have the same meanings as defined above, with an aromatic amine represented by the formula,

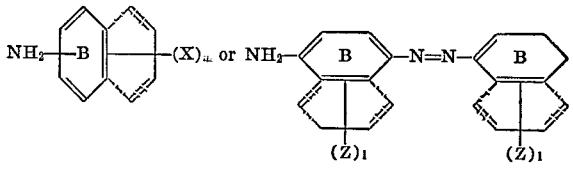
(III)                          (IV)

wherein B, X, Z, $l$ and $m$ have the same meanings as defined above.

Concrete examples of the naphthostyril derivatives represented by the Formula II include compounds of the structural formulas shown below.

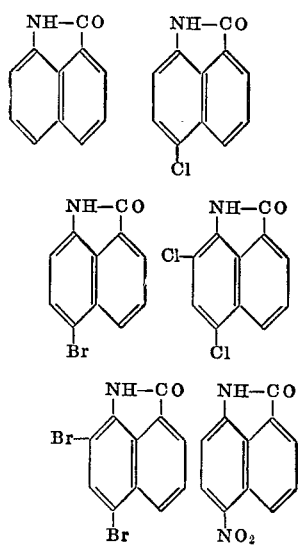

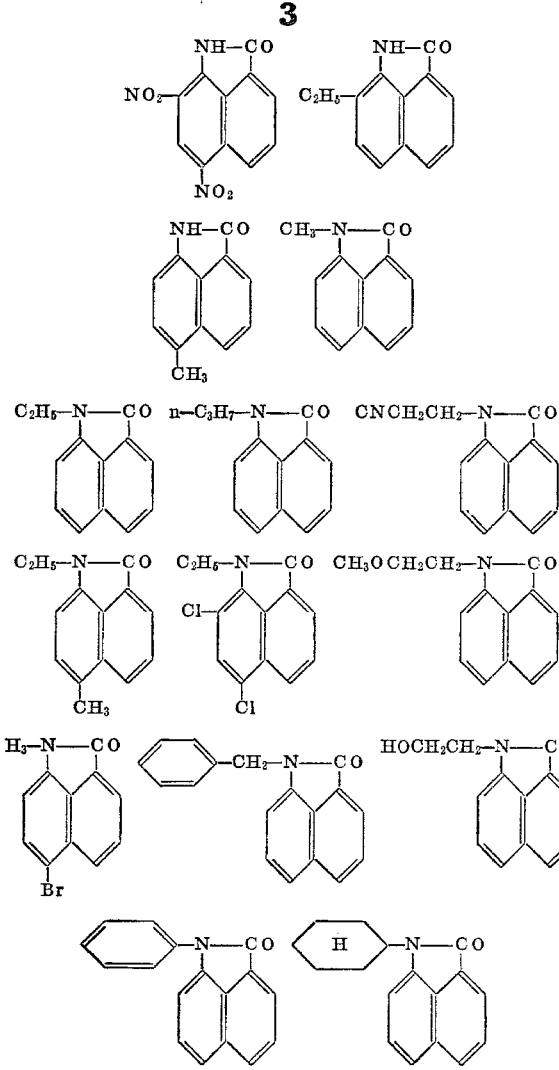
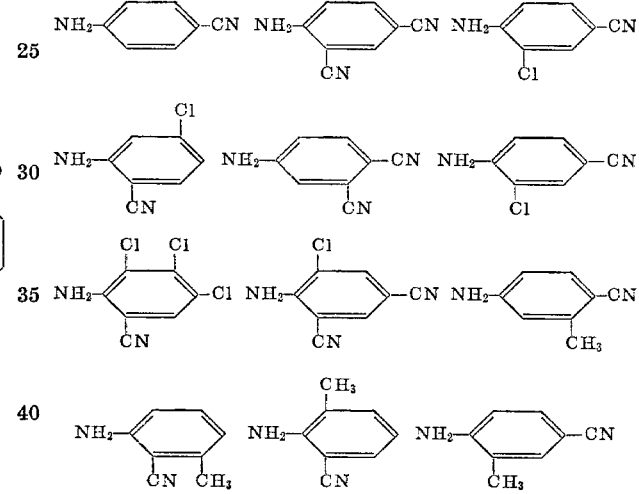
Further, examples of the aromatic amine derivatives represented by the Formulas III and IV include compounds of the structural formulas shown below.
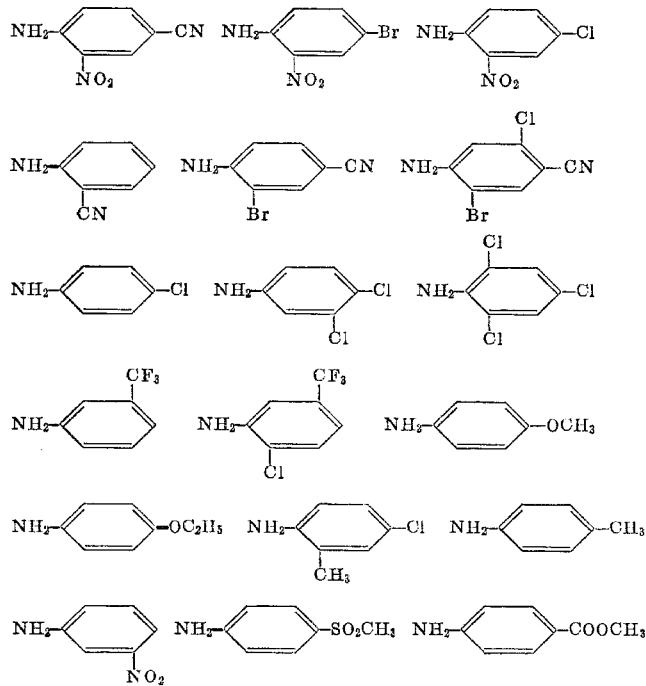

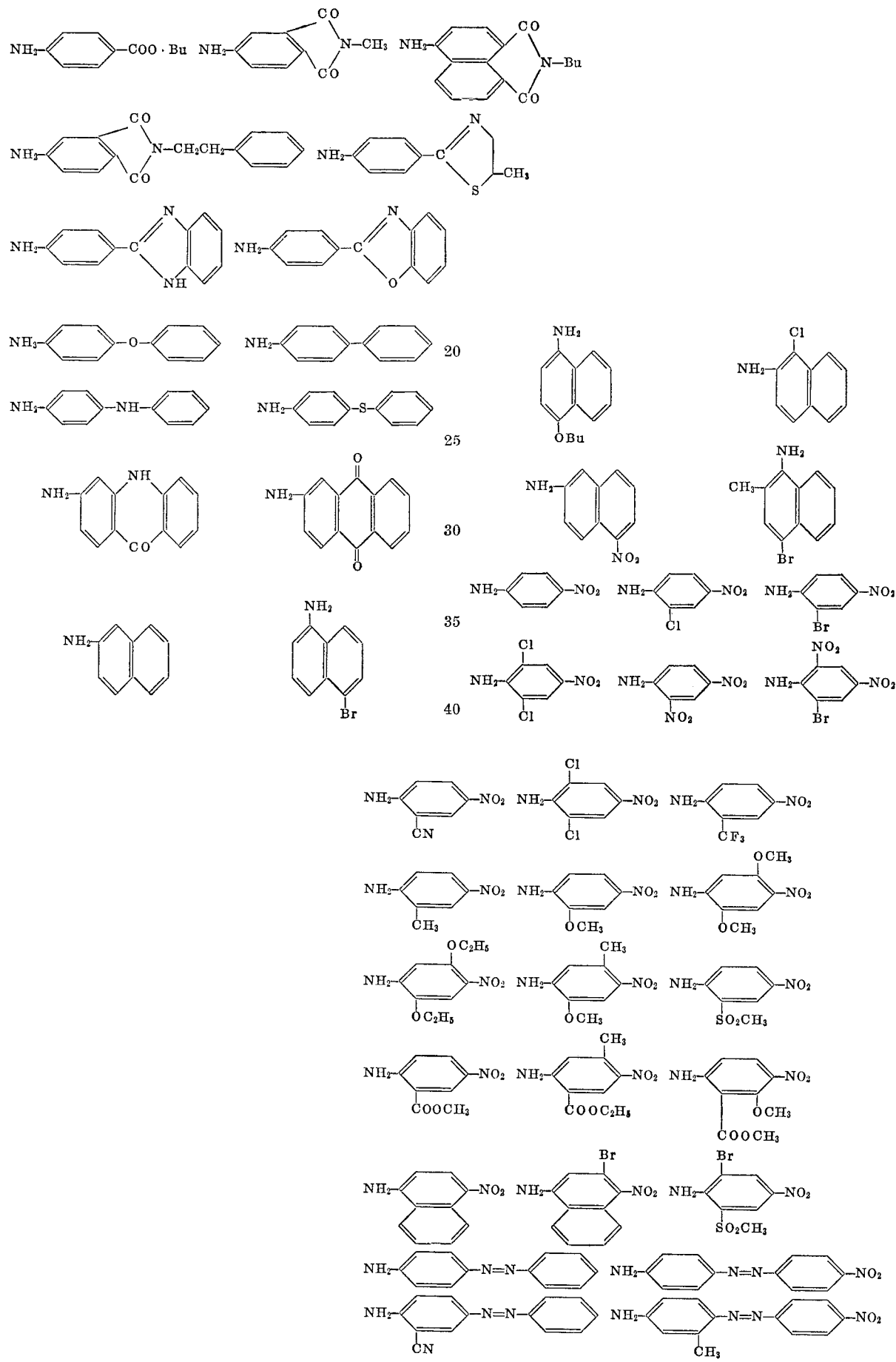

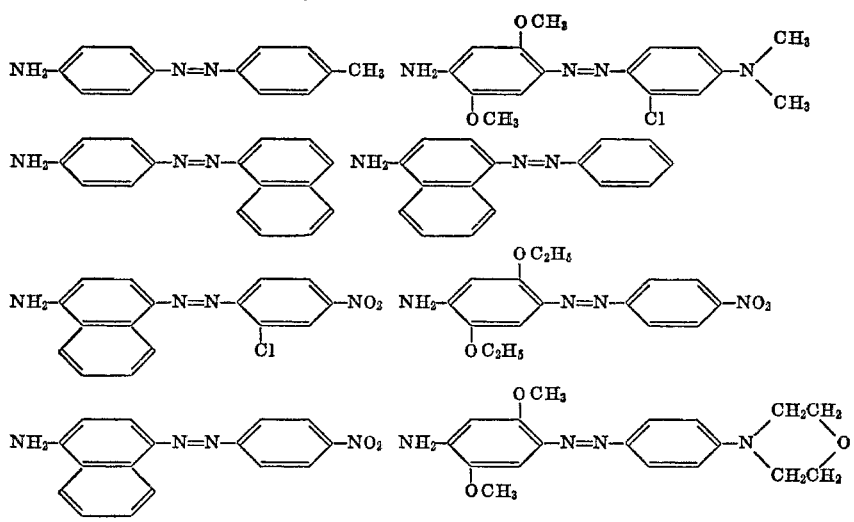

The reaction of the aromatic amine derivative (III) or (IV) with the aforesaid naphthostyril (II) can be easily completed by stirring the two in an inert solvent in the presence of a condensing agent at an elevated temperature, preferably at 70°–130° C., for several hours until an intermediary naphthostyril has been extinguished. After completion of the reaction, the product may be recovered by cooling and then filtering the reaction liquid either as it is or after dilution with an alcohol. Alternatively, the product may be recovered by neutralizing the acid and then removing the solvent by steam distillation. In case the product has been obtained as an acid salt, e.g. hydrochloride salt, the product is treated with a basic substance such as caustic alkali or an alkali metal carbonate or is dissolved in a basic substance such as pyridine or triethylamine and is then diluted with water, whereby the added acid can be easily removed.

A dye of the Formula I, in which the substituents, Y is halogen atoms, can be obtained by further treating the compound, which has been obtained by the above-mentioned condensation reaction and has no halogen atoms as substituents in naphthostyril, with a halogenating agent according to an ordinary procedure. Further, dyes of the Formula I, wherein W is an alkyl or aralkyl group, may be obtained according to any of the two processes; a process in which an N-alkylated naphthostyril is subjected to condensation reaction, and a process in which the N-alkylation is effected after subjecting a not N-alkylated naphthostyril to condensation reaction. Both processes, however, successfully give the desired products.

Examples of the inert solvent employed in the condensation reaction include benzene, toluene, xylene, monochlorobenzene, dichlorobenzene, nitrobenzene and carbon tetrachloride. Examples of the condensing agent employed include phosphorus oxychloride, phosphorus tribromide, phosphorus trichloride, phosphorus pentachloride, aluminum chloride, thionyl chloride and sulfuryl chloride.

The new dyes of the present invention are employed for the dip-dyeing or printing of synthetic fibers or semi-synthetic fibers or for the coloration of synthetic resin materials, and are particularly useful for the dyeing of aromatic polyesters, polyamides, polyester ethers, polyurethanes and cellulose triacetate. Particularly in the case of aromatic polyester type fibers, the dyes of the present invention can display dyeing efficiencies excellent in fastness to light and sublimation with high color yields and favorable even dyeing effects and favorable fiber affinity.

This is, the dye of the present invention is dispersed in water together with a suitable dispersant, e.g. a condensate of naphthalenesulfonic acid with formaldehyde, to prepare a dye bath. Using the thus prepared dye bath, a polyester type fiber is dyed according to high temperature dyeing at 120°–130° C., carrier dyeing at 100° C. or thermosol dyeing process at 180–210° C., while an acetyl-cellulose or polyamide fiber is dyed at 85°–100° C., or alternatively, a printing paste containing said dispersed dye is printed on a fiber and is then subjected to heat treatment, whereby dyed products excellent in fastness to light and sublimation can be obtained.

In the present dyes, a dye obtained by using an aromatic amine (III) having strong electron attractive groups as the substituent X such as nitro group displays so large molar extinction coefficient and good fastness that the dye may be advantageously employed in practice.

The present invention will be illustrated below with reference to examples, in which all parts are by weight.

EXAMPLE 1

A mixture comprising 120 parts of monochlorobenzene, 20 parts of naphthostyril and 18 parts of p-nitroaniline is heated to 100° C. To this mixture is added drop by drop 20 parts of phosphorus oxychloride over a period of about 30 minutes. After maintaining at 100°±5° C. for 2 hours, the mixture is cooled to room temperature, and 30 parts of methanol is added drop by drop to the mixture. The mixture is allowed to stand overnight and then filtered and washed with methanol to obtain wet crystals. The wet crystals are dispersed in 1000 parts of water, and the dispersion is made weakly alkaline by addition of caustic soda under thorough stirring and is then filtered, washed with water and dried to obtain 29.4 parts of a yellow crystalline compound having the assumed structure as shown below.

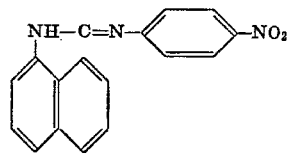

M.P. 247°–249°C.

This compound has good affinity for polyester fibers and dyes said fibers to a deep yellow color favorable in fastness to light, sublimation and washing.

EXAMPLE 2

A mixture comprising 36 parts of monochlorobenzene, 6.0 parts of naphthostyril and 8.5 parts of 2-bromo-4-nitroaniline is heated to 100° C. To this mixture is added drop by drop 6.1 parts of phosphorus oxychloride over a period of about 1 hour, and the mixture is maintained at 100°–110° C. for 3.5 hours. Subsequently, the reaction liquid is allowed to cool. When the temperature has lowered to 60° C., 8 parts of methanol is added drop by drop and when the temperature has reached 25° C., the liquid is filtered to obtain crystals. The crystals are washed with methanol and then with water. When no acid has been observed at all in the wash liquid, the crystals are further washed with methanol and then dried, whereby 9.6 parts of golden colored crystals represented by the structural formula shown below are obtained.

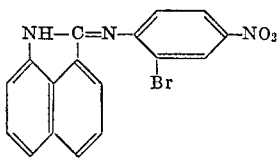

m.p. 210°–212°C.

*Elementary analysis.*—Calculated (percent): C, 55.4; H, 2.74; N, 11.4; Br, 21.7. Found (percent): C, 55.1; H, 2.78; N, 10.8; Br, 22.8.

The thus obtained novel dye dyes polyester fibers to a fast yellow color.

EXAMPLE 3

A mixture comprising 90 parts of monochlorobenzene, 15 parts of naphthostyril and 18.3 parts of 2-trifluoromethyl-4-nitroaniline is heated to 100° C. To this mixture is added drop by drop 15 parts of phosphorus oxychloride over a period of about 30 minutes. After maintaining at 100°–110° C. for 2 hours, the mixture is cooled to room temperature, and 30 parts of methanol is added drop by drop to the mixture. Subsequently, the mixture is filtered and washed with methanol to obtain wet crystals. The wet crystals are dispersed in 1000 parts of water, and the dispersion is made alkaline by addition of caustic soda under thorough stirring and is then stirred at 50°–60° C. for several hours. When no variation of pH has been observed, the dispersion is filtered at an alkaline pH, washed with hot water and then dried, whereby 23.0 parts of yellow crystals represented by the structural formula shown below are obtained.

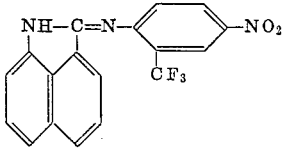

m.p. 239°–241°C.

The thus obtained novel dye dyes polyester fibers to a fast yellow color.

EXAMPLE 4

A mixture comprising 40 parts of monochlorobenzene, 5 parts of naphthostyril and 6 parts of 2-chloro-4-nitroaniline is heated to 90° C. To this mixture is added drop by drop 5 parts of phosphorus oxychloride. After maintaining at 90°–100° C. for 2 hours, the mixture is cooled, charged with 8 parts of methanol, filtered at 25° C. and washed with methanol. Subsequently, the mixture is thoroughly washed with a 1% aqueous sodium carbonate solution and then washed with water and dried to obtain a novel dye represented by the structural formula shown below.

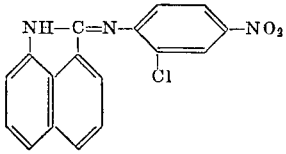

m.p. 206°–208°C.

This dye dyes polyester fibers to a fast yellow color.

EXAMPLE 5

A mixture comprising 60 parts of monochlorobenzene, 10 parts of naphthostyril and 12.8 parts of 2,4,5-trichloroaniline is heated to 100° C. To the mixture is added drop by drop 10 parts of phosphorus oxychloride, and the mixture is maintained at 100° C. for 2 hours. After confirming according to chromatography that the starting naphthostyril has extinguished, the mixture is cooled to 25° C. and charged with 40 parts of methanol. Subsequently, the mixture is filtered, washed with methanol and then subjected to the same alkali treatment as in Example 1 to obtain a yellow novel dye represented by the structural formula shown below.

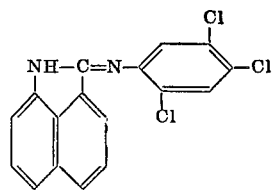

m.p. 211°–213°C.

EXAMPLE 6

A mixture comprising 100 parts of nitrobenzene, 5 parts of naphthostyril and 8 parts of an amine of the formula,

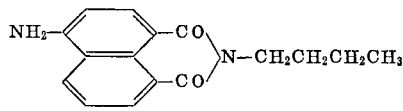

was heated to 100° C. To this mixture is added drop by drop at said temperature 5 parts of phosphorus oxychloride. After maintaining at 90°–100° C. for 1 hour, the mixture is cooled, filtered and washed with methanol and then with water to obtain crystals. The crystals are dispersed in 300 parts of water, and the dispersion is neutralized to pH 8 by addition of caustic soda under thorough stirring at 50° C., and is then filtered, washed and dried, whereby 10 parts of a compound represented by the structural formula shown below is obtained.

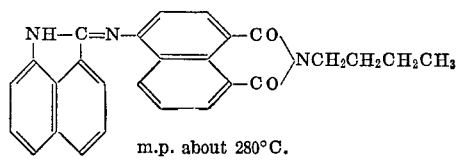

m.p. about 280°C.

This compound dyes polyester fibers to a clear orange color.

EXAMPLE 7

A mixture comprising 30 parts of monochlorobenzene, 5.0 parts of naphthostyril and 6.4 parts of p-aminoazobenzene is heated to 100° C. To this mixture is added drop by drop 5.0 parts of phosphorus oxychloride over a period of about 30 minutes. After maintaining at 100°±5° C. for 2 hours, the mixture is cooled and 30 parts of methanol is added drop by drop. Deposited crystals are filtered and washed with methanol to obtain a wet cake. The wet cake is suspended in 200 parts of water, and the suspension is made weakly alkaline by addition of caustic soda. After stirring for a while, the suspension is filtered, washed with water and then dried to obtain in a high yield orange crystals represented by the structural formula shown below.

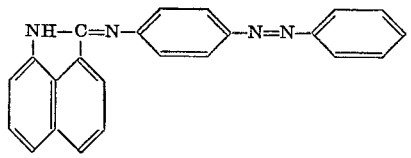

This compound dyes polyester fibers to an orange color.

EXAMPLE 8

A mixture comprising 100 parts of nitrobenzene and 10 parts of naphthostyril is heated to 50° C. To this mixture is added drop by drop 8.5 parts of bromine over a period of 30 minutes. After maintaining at 50° C. for 2 hours, the mixture is charged with 10 parts of p-nitroaniline and is heated to 80° C. To the mixture is added drop by drop 10 parts of phosphorus oxychloride over a period of 30 minutes. The mixture is maintained at 80°–85° C. for 3 hours and, after confirming the terminal of the reaction, 20 parts of methanol is added drop by drop. Subsequently, the reaction mixture is filtered, washed and neutralized to obtain a novel dye represented by the structural formula shown below.

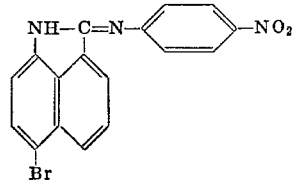

m.p. 271°–273°C.

This dye dyes polyester fibers to a fast, deep yellow color.

The above procedures are repeated, except that 9.6 parts of sulfuryl chloride is used in place of 8.5 parts of the bromine employed, whereby a similar dye represented by the formula shown below is obtained.

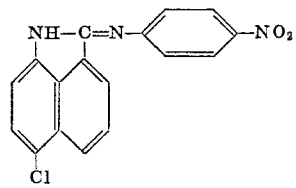

EXAMPLE 9

Example 8 is repeated, except that N-methyl-naphthostyril is used as a starting material in place of the naphthostyril, whereby a novel dye represented by the formula shown below is obtained.

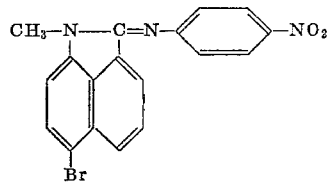

This dye dyes polyester fibers to a reddish yellow color.

EXAMPLE 10

A mixture comprising 3.7 parts of 1,2-dihydro-2[(4'-nitro-2'-bromophenyl)imido]-benz [cd]indole, 4.7 parts of p-toluenesulfonic acid methyl ester, 11 parts of methyl cellosolve and 3.5 parts of potassium carbonate is gradually heated to 100° C. After maintaining at 90°–100° C. for 1 hour, the mixture is cooled to 25° C. Subsequently, 10 parts of methanol is added drop by drop to the mixture, and deposited crystals are filtered, washed with methanol and then with water, and dried to obtain a novel dye represented by the formula shown below.

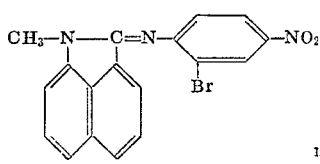

m.p. 186°–188°C.

This dye dyes polyester fibers to a reddish yellow color.

EXAMPLE 11

Example 10 is repeated, except that 4.7 parts of benzyl bromide is used in place of 4.7 part of p-toluene-sulfonic acid methyl ester, whereby a novel dye represented by the formula shown below is obtained.

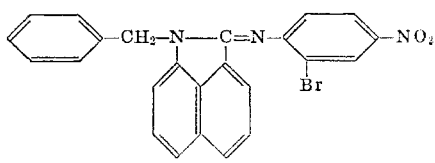

This dye colors synthetic resins to an orange color.

EXAMPLE 12

A mixture comprising 5 parts of 6,8-dichloronaphthostyrill, 3.8 parts of 2-cyano-4-nitroaniline and 40 parts of nitrobenzene is heated to 100° C. To this mixture is added drop by drop 4 parts of phosphorus oxychloride at 100°–115° C., and the mixture is maintained at said temperature for 3 hours. Subsequently, the mixture is aftertreated in the same manner as in Example 1 to obtain a yellow crystalline compound represented by the formula shown below.

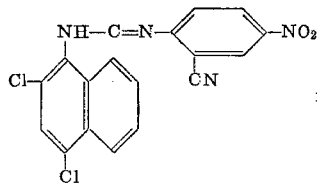

m.p. about 270°C.

This compound dyes polyester fibers to a fast, brilliant yellow color.

EXAMPLE 13

Example 10 is repeated, except that 3.8 parts of naphthostyril is used in place of 5 parts of the 6,8-dichloronaphthostyril, whereby a yellow crystalline compound represented by the formula shown below is obtained.

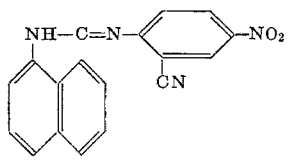

This compound dyes polyester fibers to a fast brilliant yellow color.

EXAMPLE 14

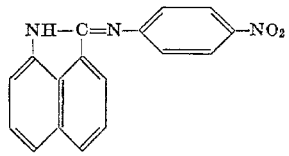

A mixture comprising 4 parts of a compound represented by the above structural formula, 6 parts of sodium dinaphthylmethane disulfonate and 20 parts of water is pulverized in a ball mill for 48 hours, and the resulting colloidal liquid is spray-dried to obtain 10 parts of a dye. One part of the thus obtained dye is dispersed in 1000 parts of water to prepare a dye bath. Into this dye bath is charged 25 parts of a yarn spun from a polyester (having a trade name of Tetron). The bath is gradually heated and dyeing is effected at 130° C. for 60 minutes under pressure. After the dyeing, the yarn is washed with hot water, subjected to reduction clearing and then dried to obtain a dyed product having a deep, clear yellow color. This product is markedly excellent in fastness to light, sublimation, washing and the like.

EXAMPLE 15

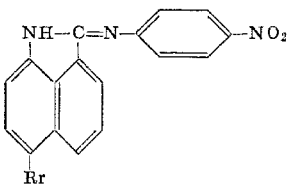

Using 4 parts of a compound represented by the above structural formula, 10 parts of a dye is obtained in the same manner as in Example 14. One part of the thus obtained dye is charged into 1000 parts of water together with 4 parts of o-phenylphenol, 2 parts of acetic acid and 20 parts of a polyester-spun yarn, and dyeing is effected at 100° C. for 90 minutes. After the dyeing, the yarn is washed with hot water, subjected to reduction clearing and then dried to obtain a dyed product having a deep reddish yellow color. This dyed product is markedly excellent in fastness to light, sublimation and washing.

EXAMPLE 16

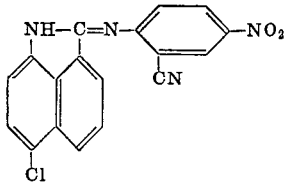

Using 4 parts of a compound represented by the above structural formula, 10 parts of a dye is obtained in the same manner as in Example 14.

A polyester fabric is printed with a paste comprising 5 parts of said dye, 30 parts of water and 65 parts of a starch-tragacanth thickener and is then dried. Subsequently, the printed fabric is heat-treated at 200° C. for 2 minutes, washed with water and subjected to reduction clearing to obtain a dyed product having a brilliant greenish yellow color. This dyed product is markedly excellent in fastness to light, sublimation and washing.

EXAMPLE 17

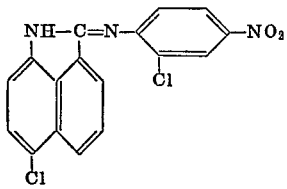

One part of a compound represented by the above structural formula is dispersed in 1000 parts of water to prepare a dye bath.

Twenty parts of a cellulose triacetate fabric is charged into said dye bath and dyed at 100° C. for 1 hour. After the dyeing, the fabric is washed with water, soaped, washed with water and dried to obtain a dyed product having a fast reddish yellow color.

EXAMPLES 18–77

In place of the dyes employed in Examples 14 to 16, dyes containing compounds of the structures shown in the table below are used to dye polyester fibers to obtain dyed products fast in hue shown in the right-most column of the table.

| Example No. | Structure of compound | Hue on polyester fiber |
|---|---|---|
| 18 | | Reddish yellow. |
| 19 | | Do. |
| 20 | | Yellow. |
| 21 | | Clear orange. |
| 22 | | Reddish yellow. |
| 23 | | Do. |

| Example No. | Structure of compound | Hue on polyester fiber |
|---|---|---|
| 24 | (naphthalene with =CH₂—N and —C=N—C₆H₄—NO₂ substituents) | Do. |
| 25 | C₂H₅—N—C=N—C₆H₄—NO₂ (naphthalene with Cl) | Do. |
| 26 | NH—C=N—C₆H₃(Br)—NO₂ (naphthalene with Cl) | Yellow. |
| 27 | NH—C=N—C₆H₃(CN)—NO₂ (naphthalene with C₂H₅) | Brilliant greenish yellow. |
| 28 | CH₃—N—C=N—C₆H₃(CN)—NO₂ (naphthalene with Cl, Cl) | Clear yellow. |
| 29 | CH₃—N—C=N—C₆H₃(CN)—NO₂ (naphthalene) | Do. |
| 30 | NH—C=N—C₆H₃(CN)—NO₂ (naphthalene with Br, Br) | Clear orange. |
| 31 | NH—C=N—C₆H₂(Cl,Cl)—NO₂ (naphthalene with Br) | Yellow. |
| 32 | NH—C=N—C₆H₃(CF₃)—NO₂ (naphthalene with Br) | Do. |

| Example No. | Structure of compound | Hue on polyester fiber |
|---|---|---|
| 33 | 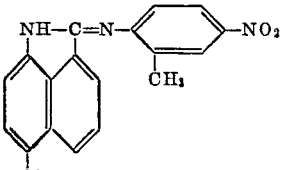 | Reddish yellow. |
| 34 | 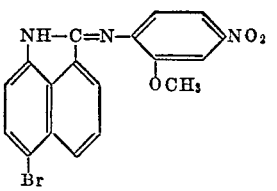 | Yellow. |
| 35 | 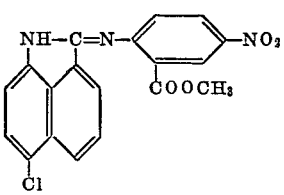 | Reddish yellow. |
| 36 | 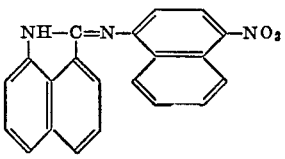 | Orange. |
| 37 | 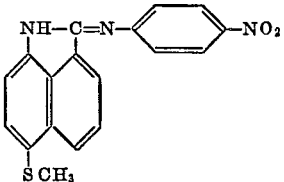 | Reddish yellow. |
| 38 | 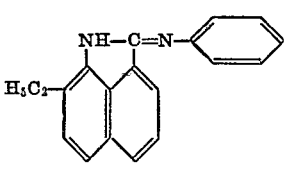 | Yellow. |
| 39 | 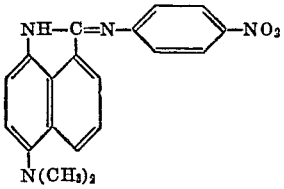 | Reddish orange. |
| 40 | 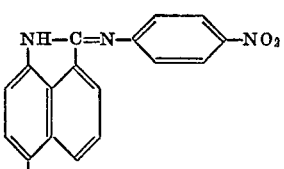 | Reddish yellow. |
| 41 | 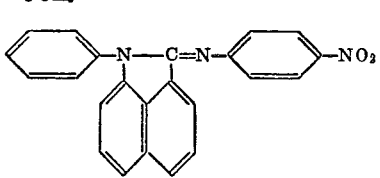 | Yellow. |

| Example No. | Structure of compound | Hue on polyester fiber |
|---|---|---|
| 42 | 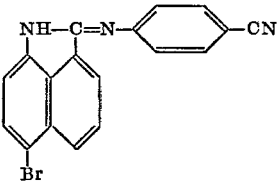 | Do. |
| 43 | 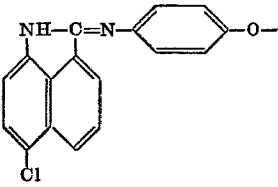 | Do. |
| 44 | 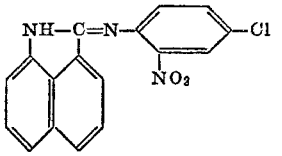 | Do. |
| 45 | 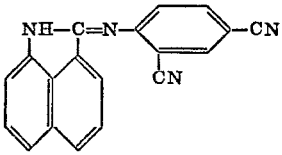 | Brilliant yellow. |
| 46 | 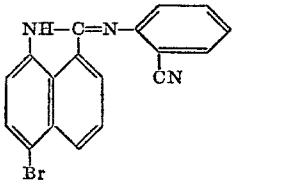 | Brilliant greenish yellow. |
| 47 | 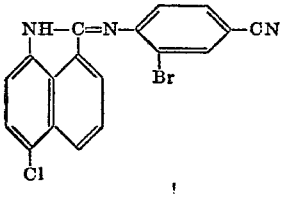 | Yellow. |
| 48 | 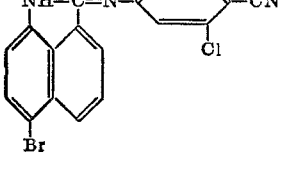 | Do. |
| 49 | 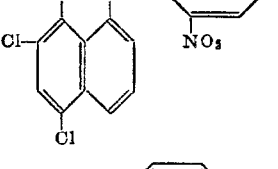 | Orange. |
| 50 | 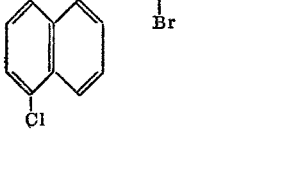 | Yellow. |

| Example No. | Structure of compound | Hue on polyester fiber |
|---|---|---|
| 51 | 8-nitro-1-naphthyl-NH—C=N—C₆H₄—Cl | Orange. |
| 52 | CH₃—N(naphthyl-2-Cl)—C=N—C₆H₃(Cl)—SO₂CH₃ | Yellow. |
| 53 | (6-Cl-naphthyl)-HN—C=N—C₆H₄—COOC₂H₅ | Do. |
| 54 | (2-C₂H₅-naphthyl)-NH—C=N—C₆H₃(CO—N(CH₂CH₂CH₃)—CO) (phthalimide) | Do. |
| 55 | (6-OCH₃-naphthyl)-NH—C=N—C₆H₃(CO—NCH₂CH₂—C₆H₅—CO) | Reddish yellow. |
| 56 | (6-Cl-naphthyl)-NH—C=N—C₆H₄—C(=N)(S)(6-CH₃-benzothiazole) | Yellow. |
| 57 | C₂H₅—N(6-N(CH₃)₂-naphthyl)—C=N—C₆H₄—CN | Reddish orange. |
| 58 | CH₃—N(naphthyl)—C=N—(2-naphthyl) | Reddish yellow. |
| 59 | naphthyl-NH—C=N—(1-naphthyl) | Do. |

| Example No. | Structure of compound | Hue on polyester fiber |
|---|---|---|
| 60 | 8-chloro-naphthalene-1-NH-C(=N-C6H4-C6H5)- | Yellow. |
| 61 | naphthalene-1-NH-C(=N-C6H4-NH-C6H5)- | Orange. |
| 62 | naphthalene-1-NH-C(=N-C6H4-C(=indol-2-yl)H)- | Yellow. |
| 63 | 1-(N-benzyl)naphthalene-C(=N-C6H4-CN)- | Do. |
| 64 | 1-(N-phenyl)naphthalene-C(=N-C6H4-Cl)- | Do. |
| 65 | 6-chloro-naphthalene-1-NH-C(=N-(4-ethoxynaphth-1-yl))- | Orange. |
| 66 | naphthalene-1-NH-C(=N-anthraquinonyl)- | Do. |
| 67 | naphthalene-1-NH-C(=N-C6H4-N=N-C6H4-NO2)- | Do. |
| 68 | naphthalene-1-NH-C(=N-C6H3(CH3)-N=N-C6H4-NO2)- | Reddish orange. |
| 69 | 1-(N-methyl)naphthalene-C(=N-naphth-N=N-C6H5)- | Orange. |

| Example No. | Structure of compound | Hue on polyester fiber |
|---|---|---|
| 70 | (naphthalene with H₅C₂—, NH—C=N—C₆H₄—N=N—C₆H₄—NO₂) | Do. |
| 71 | (naphthalene with N(CH₃)₂, NH—C=N—C₆H₄—N=N—C₆H₅) | Reddish orange; |
| 72 | (naphthalene, NH—C=N—C₆H₂(OCH₃)₂—N=N—C₆H₃(Cl)—N(CH₃)₂) | Orange; |
| 73 | (naphthalene, C₆H₅—CH₂—N—C=N—C₆H₃(CN)—N=N—C₆H₅) | Reddish yellow; |
| 74 | (naphthalene with OCH₃, C₂H₅—N—C=N—C₆H₄—N=N—C₆H₄—NO₂) | Reddish orange; |
| 75 | (naphthalene, NCCH₂CH₂—N—C=N—C₆H₄—N=N—C₆H₅) | Reddish yellow; |
| 76 | (naphthalene, CH₃—N—C=N—C₆H₄—N=N—C₆H₄—NO₂) | Reddish orange; |
| 77 | (naphthalene with Br, NH—C=N—C₆H₄—N=N—C₆H₅) | Orange; |

What we claim is:

1. A compound of the formula

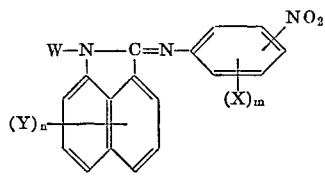

wherein W is hydrogen, (C₁–C₃) lower alkyl, benzyl, or phenyl group; Y is hydrogen, halogen, nitro, (C₁–C₂) lower alkyl, (C₁–C₂) lower alkoxy, methylmercapto or dimethylamino group; X is hydrogen, cyano, nitro, halogen, trifluoromethyl, methyl, (C₁–C₂) lower alkoxy, —SO₂R or —COOR; n is an integer of 1 to 4; m is an integer of 1 to 4; and R is (C₁–C₄) lower alkyl.

2. A compound of the formula

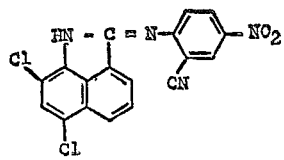

3. A compound of the formula
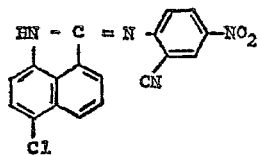
4. A compound of the formula
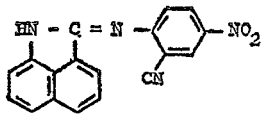
5. A compound of the formula
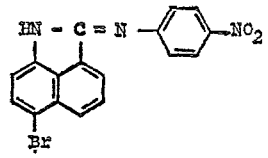
6. A compound of the formula
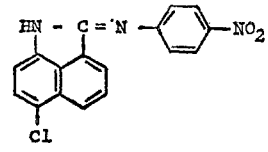
7. A compound of the formula
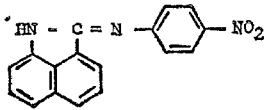
8. A compound of the formula
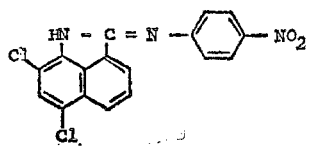
9. A compound of the formula
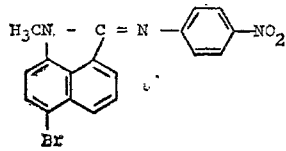
10. A compound of the formula
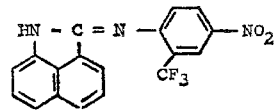
References Cited
UNITED STATES PATENTS
2,663,714  12/1953  Kornfeld _____ 260—326.5
ALEX MAZEL, Primary Examiner
J. A. NARCAVAGE, Assistant Examiner
U.S. Cl. X.R.
8—41 B, 41 C; 106—193 D; 260—37 N, 152, 288 R, 304, 307 D, 309.2, 326.3, 326.5 B, 326.9